(12) United States Patent
Fortusini et al.

(10) Patent No.: US 9,423,577 B2
(45) Date of Patent: Aug. 23, 2016

(54) OPTICAL RECEPTACLES HAVING COMPLIANCE SUPPORT INTERFACE FOR FACILITATING ALIGNMENT WITH FIBER OPTIC CONNECTORS DURING INSERTION, AND RELATED COMPONENTS, SYSTEMS, AND METHODS

(71) Applicant: Corning Cable Systems LLC, Hickory, NC (US)

(72) Inventors: Davide Domenico Fortusini, Ithaca, NY (US); Micah Colen Isenhour, Lincolnton, NC (US); Christopher Paul Lewallen, Hudson, NC (US); James Phillip Luther, Hickory, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 0 days.

(21) Appl. No.: 14/090,448

(22) Filed: Nov. 26, 2013

(65) Prior Publication Data
US 2015/0147037 A1 May 28, 2015

(51) Int. Cl.
*G02B 6/36* (2006.01)
*G02B 6/42* (2006.01)
*G02B 6/38* (2006.01)

(52) U.S. Cl.
CPC ............ *G02B 6/4228* (2013.01); *G02B 6/4292* (2013.01); *G02B 6/3885* (2013.01); *G02B 6/4249* (2013.01)

(58) Field of Classification Search
CPC .. G02B 6/4292; G02B 6/4249; G02B 6/4246; G02B 6/42; G02B 6/4228; G02B 6/36
USPC ................................... 385/53, 88, 90, 91, 92
See application file for complete search history.

(56) References Cited

U.S. PATENT DOCUMENTS

| 4,461,538 A | 7/1984 | Breed, III et al. ............ 350/96.2 |
| 2012/0063727 A1 | 3/2012 | Wu |
| 2013/0089290 A1 | 4/2013 | Sloey et al. ...................... 385/74 |
| 2014/0153875 A1* | 6/2014 | Bradley ............... G02B 6/3807 385/60 |

FOREIGN PATENT DOCUMENTS

| EP | 2453279 A1 | 5/2012 |
| EP | 2478597 A1 | 7/2012 |

* cited by examiner

*Primary Examiner* — Jennifer Doan

(57) ABSTRACT

Optical receptacles having compliance for facilitating alignment with fiber optic connectors during insertion, and related components, systems and methods are disclosed. In one example, an optical receptacle disposed in a receptacle optical assembly optically connects to a fiber optic component, for example, a ferrule, for facilitating transmission of an optical signal from the optical receptacle to the exemplary ferrule. A support interface between the optical receptacle and receptacle housing contains a compliance feature that permits the optical receptacle to move with respect to the receptacle housing during insertion of the fiber optic connector. An insertion force of the fiber optic connector causes the optical receptacle to be able to move into optical alignment with the connector during insertion of the fiber optic connector, thereby moving ferrule(s) of the fiber optic connector into optical alignment with the ferrule(s) of the optical receptacle.

34 Claims, 9 Drawing Sheets

OPTICAL RECEPTACLES HAVING COMPLIANCE SUPPORT INTERFACE FOR FACILITATING ALIGNMENT WITH FIBER OPTIC CONNECTORS DURING INSERTION, AND RELATED COMPONENTS, SYSTEMS, AND METHODS

FIELD

The disclosure relates generally to optical receptacles for receiving fiber optic connectors and more particularly to optical receptacles having a compliance support interface which may be used in fiber optic components included on devices such as consumer electronics.

BACKGROUND

Benefits of optical fiber include extremely wide bandwidth and low noise operation. Because of these advantages, optical fiber is increasingly being used for a variety of applications, including, but not limited to, broadband voice, video, and data transmission. Fiber optic components employing optical fiber are being developed and used to transfer voice, video, and data transmissions between devices and over networks. In this regard, fiber optic connections are increasingly being used in consumer-level devices.

Fiber optic connectors are provided to facilitate optical connections with optical fibers for the transfer of light. For example, optical fibers can be optically connected to another optical device, such as a light-emitting diode (LED), laser diode, or opto-electronic device for light transfer. As another example, optical fibers can be optically connected to other optical fibers through mated fiber optic connectors. In any of these cases, it is important that the end face of an optically connected optical fiber be precisely aligned with the optical device or other optical fiber to avoid or reduce coupling loss. For example, the optical fiber is disposed through a ferrule that precisely locates the optical fiber with relation to the fiber optic connector housing.

Conventional connection schemes include compliance mechanisms in the fiber optic connector, which allow the ferrule(s) of the connector to move with respect to the connector housing during insertion so that the ferrule(s) are biased toward alignment with a stationary receptacle. The stationary receptacle may include a daughter card connected to the optical fiber(s)/ferrule(s) of the receptacle via a flexible printed circuit board (PCB) or other suitable electro-optical connection.

SUMMARY

Embodiments of the present disclosure include optical receptacles having compliance for facilitating alignment with fiber optic connectors during insertion, and related components, systems, and methods. In one embodiment, a receptacle optical assembly having an optical receptacle disposed therein is disclosed. The optical receptacle optically connects to a fiber optic component of a complimentary connector, for example, a ferrule of a plug, for facilitating transmission of an optical signal from the optical receptacle to the exemplary ferrule of the plug. A support interface is disposed between the receptacle housing and the optical receptacle. The support interface contains a compliance feature that permits the optical receptacle to move with respect to the receptacle housing during insertion of the fiber optic connector. The movement can include, without limitation, rotation and/or translation of the optical receptacle with respect to the receptacle housing.

An insertion force of the complementary fiber optic connector causes the optical receptacle to be able to move into optical alignment with the connector during insertion of the fiber optic connector. Thus, by providing the support interface compliance features in the optical receptacle assembly, the ferrule(s) of the complementary fiber optic connector are moved into optical alignment with the optical receptacle. This accordingly allows a simple, monolithic complementary fiber optic connector to be used, because the required compliance is provided by the receptacle optical assembly. Thus, the fiber optic connector does not need to include any compliance features or moving parts, thereby permitting the size and complexity of the fiber optic connector to be reduced. This arrangement has particular advantages in consumer electronics applications, where simplicity and durability of external components are especially desirable.

In one exemplary embodiment, a receptacle optical assembly for receiving a complementary fiber optic connector is disclosed. The receptacle optical assembly comprises a receptacle housing and an optical receptacle disposed in the receptacle housing. The optical receptacle is configured to optically connect with at least one fiber optic component of the complementary fiber optic connector. The receptacle optical assembly further comprises at least one compliance support interface disposed between the receptacle housing and the optical receptacle. The at least one support interface is configured to permit the optical receptacle to move with respect to the receptacle housing in response to insertion of a fiber optic connector such that an insertion force of the connector causes the optical receptacle to move into optical alignment with the fiber optic connector.

In another exemplary embodiment, a method of inserting a fiber optic connector into a receptacle optical assembly is disclosed. The method comprises longitudinally aligning the fiber optic connector with an optical receptacle of the receptacle optical assembly. The method further comprises applying an insertion force to the fiber optic connector such that the optical receptacle moves with respect to a receptacle housing of the receptacle optical assembly into optical alignment with the fiber optic connector in response to the insertion force.

In another exemplary embodiment, a system for optically connecting fiber optic components is disclosed. The system comprises a fiber optic connector and a receptacle optical assembly for receiving the fiber optic connector. The receptacle optical assembly comprises a receptacle housing and an optical receptacle disposed in the receptacle housing. The optical receptacle is configured to optically connect with at least one fiber optic component with the fiber optic connector. The receptacle optical assembly further comprises at least one compliance support interface disposed between the receptacle housing and the optical receptacle. The at least one support interface is configured to permit the optical receptacle to move with respect to the receptacle housing in response to insertion of the fiber optic connector such that an insertion force of the connector causes the optical receptacle to move into optical alignment with the fiber optic connector.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments of the present disclosure include optical receptacles having compliance for facilitating alignment with fiber optic connectors during insertion, and related components, systems, and methods. In one embodiment, a receptacle optical assembly having an optical receptacle disposed therein is disclosed. The optical receptacle optically connects to a complementary fiber optic component, for example, a ferrule, for facilitating transmission of an optical signal from the optical receptacle to the exemplary ferrule. A support interface may be disposed between the receptacle housing and the optical receptacle. The support interface contains a compliance feature that permits the optical receptacle to move with respect to the receptacle housing during insertion of the fiber optic connector. The movement can include, without limitation, rotation and/or translation of the optical receptacle with respect to the receptacle housing. An insertion force of the fiber optic connector causes the optical receptacle to be able to move into optical alignment with the connector during insertion of the fiber optic connector. Thus, by providing the support interface compliance features in the optical receptacle assembly, the optical component such as the ferrule(s) of the fiber optic connector are moved into optical alignment with the optical receptacle. This accordingly allows a simple, monolithic fiber optic connector to be used, because the required compliance is provided by the receptacle optical assembly. Thus, the fiber optic connector does not need to include any compliance features or moving parts, thereby permitting the size and complexity of the fiber optic connector to be reduced. This arrangement has particular advantages in consumer electronics applications, where simplicity and durability of external components are especially desirable.

Figure 1:
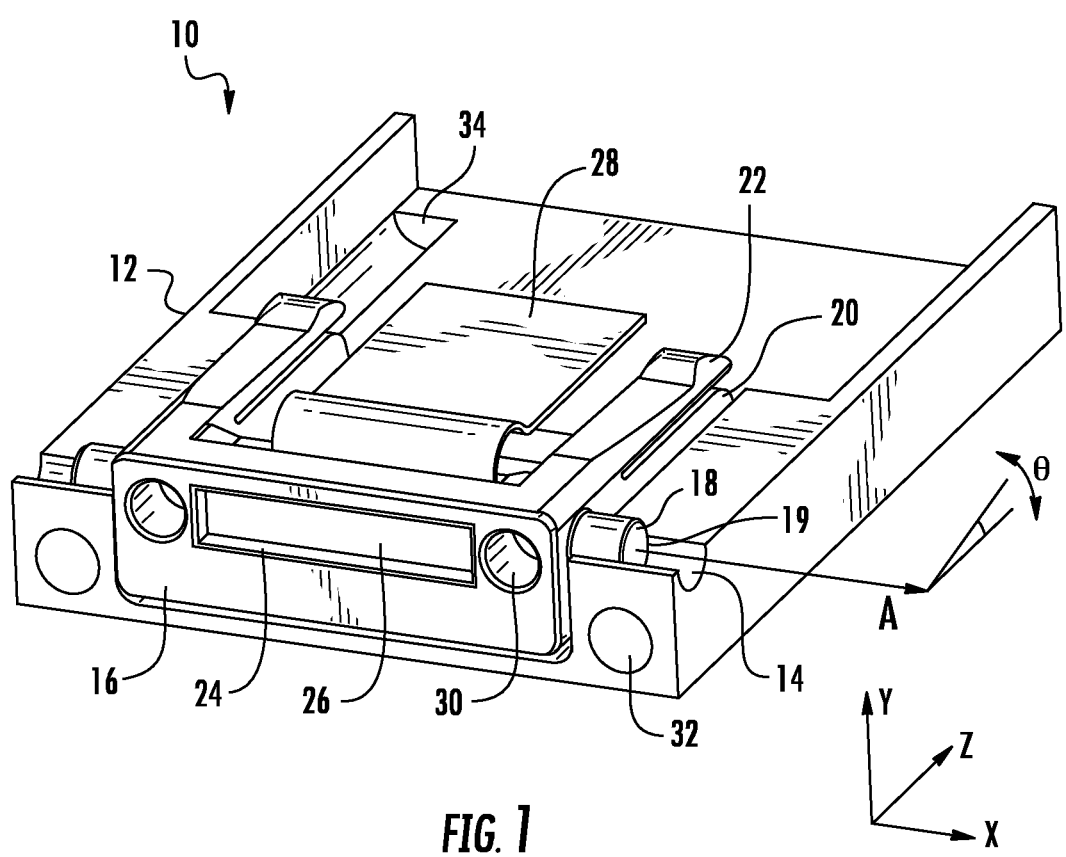
FIG. 1 illustrates a front, perspective view of the internal components of a receptacle optical assembly having an optical receptacle with a support interface for allowing rotational compliance about a horizontal rotational axis, according to an exemplary embodiment.

Various embodiments will be further clarified by the following examples. In this regard, FIG. 1 illustrates the internal components and operation of a receptacle optical assembly 10 having an optical receptacle with rotational compliance about a horizontal rotational axis A, to prevent rotational alignment errors caused by manual insertion of a fiber optic connector. In this embodiment, the receptacle optical assembly 10 may include a receptacle housing 12 having a pair of semi-cylindrical seats 14. An optical receptacle 16 may include a pair of cylindrical alignment bosses 18 or other support interface that matingly and rotationally engage with seats 14 to form a support interface 19 to support and retain optical receptacle 16 within receptacle housing 12 while permitting optical receptacle 16 to rotate about an axis defined by the support interface 19 alignment bosses 18 and seats 14. Of course, the alignment bosses 18 may have any suitable shape for meeting the requirements.

In exemplary embodiments the optical receptacle 16 may include any suitable optical pathway. By way of example, the optical pathway may include an active optical component, for example, a receive or transmit active optical component attached to a circuit board such as a daughter card (not shown). The circuit board may include at least one optical transmitting device, at least one optical receiving device, both the at least one transmitting device and the at least one receiving device, or at least one combination device capable of both receiving and transmitting optical signals. The at least one transmitting device may include, for example, a vertical-cavity surface-emitting laser (VCSEL) and a light emitting diode (LED), or other transmitting devices. The at least one receiving device may include a photodetector, for example, a photodiode. The at least one combination device may include a transceiver, for example. In yet other embodiments, the optical receptacle may include an optical pathway having passive optical components as optical fibers, gradient index lenses (GRIN), ball lenses, refractive lenses, aspheric lenses, gratings, or combinations thereof. In yet other exemplary embodiments, the receptacle may include a combination of at least one active optical component and at least one passive optical component. As will be discussed in detail below, the above described components may be secured to optical receptacle 16 and be movable with the receptacle 16 with respect to the receptacle housing 12. In other embodiments, some or all of the above described components may instead be secured to the receptacle housing 12.

In this regard, in the embodiment of FIG. 1, the optical receptacle 16 may be configured to rotate about axis A within a relatively small angular range ($\theta$). For example, in this embodiment, the desired angular range can be zero (0) to three (3) degrees, but in other embodiments the desired angular range may be configured as a plus or minus angle such as ±3 degrees. A small angular range of rotation retains the optical receptacle 16 in a relatively stationary orientation, while simultaneously permitting sufficient rotational compliance to correct for alignment errors caused by manual insertion of a connector (not shown). In this manner, a simple, non-compliant (e.g., monolithic) connector (illustrated in FIGS. 4A-4C below) can be used with the receptacle optical assembly 10, while retaining the ability to correct for rotational offset.

To maintain the optical receptacle 16 within the predetermined rotational range, a pair of stops 20 extends from optical receptacle 16 into receptacle housing 12. In addition, one or more top leaf springs 22 and/or bottom leaf springs (see FIGS. 2A and 2B below) may also be included to bias the optical receptacle 16 toward a neutral angle, while permitting the optical receptacle 16 to rotate within a predetermined angular range. In this embodiment, the top leaf springs 22 extend into the receptacle housing 12 and are cantilevered parallel to stops 20. Thus, as will be discussed in greater detail with respect to FIGS. 4A-4C, when the receptacle 16 is rotated toward an internal surface of the receptacle optical assembly 16 by an external force, such as an insertion force, the leaf springs 22 are pressed against the internal surface and move toward the stops 20 until they abut the stops 20, inhibiting further rotation. When the external force is removed, the leaf springs 22 return the optical receptacle 16 toward a neutral position.

The optical receptacle 16 may have a receptacle lens body 26 including a window 24 in the optical pathway between a receptacle side ferrule (not shown) and a ferrule of a fiber optic connector (not shown). Window 24 is optically transmissive to the wavelengths being transmitted and is formed from any suitable material such as glass or a polymer. Further, window 24 may have any suitable coating on one or more sides as desired. Electrical connections may be made between the ferrule(s) (not shown), optical receptacle 16, and other components via a flexible PCB 28, or other suitable electro-optical connection, which is itself compliant so that rotation of the optical receptacle 16 does not damage electrical components. The receptacle optical assembly 10 also may include a pair of alignment holes 30 in the optical receptacle 16 for receiving alignment pins (see FIGS. 4A-4C) of a fiber optic connector, and a pair of bores 32 for receiving mechanical fastening means, such as screws of other fasteners. In this embodiment, the receptacle housing 12 also may include a recess 34 for receiving and retaining other electrical or optical components.

Figure 2A:
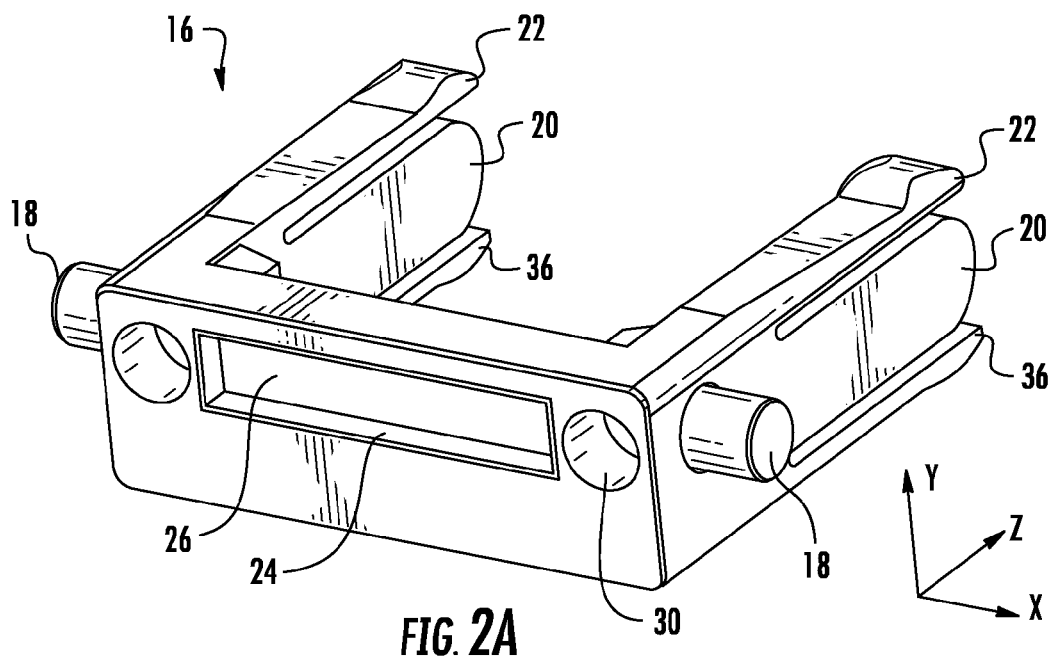
FIGS. 2A and 2B illustrate detailed front and rear views of the optical receptacle of FIG. 1, illustrating the support interfaces, stops and bias elements of the optical receptacle.
Figure 2B:
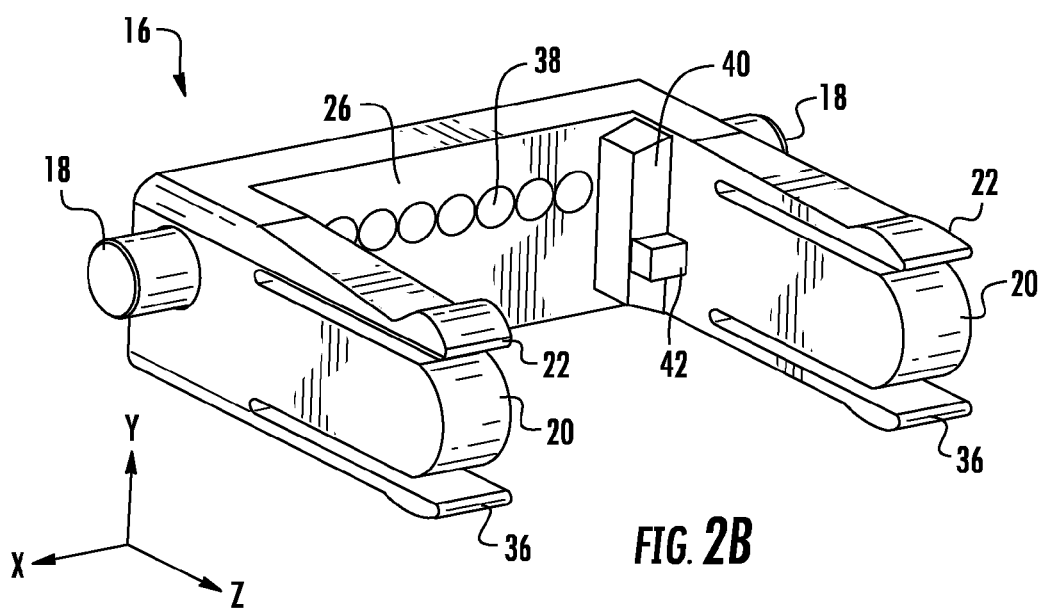

FIGS. 2A and 2B illustrate detailed front and rear views of optical receptacle 16. In particular, FIG. 2A illustrates a detailed view of stops 20 and top and bottom leaf springs 22, 36. In some embodiments, the top and bottom leaf springs 22, 36 may have different biasing forces, thereby biasing the optical receptacle 16. In this embodiment, the optical receptacle 16 may be formed as a single, monolithic component. In other embodiments, different components of the optical receptacle 16 could be formed separately in other embodiments.

FIG. 2B illustrates a rear view of optical receptacle 16, and includes another detailed view of detailed view of stops 20 and top and bottom leaf springs 22, 36. FIG. 2B also illustrates a rear view of receptacle lens body 26, including an array of lenses 38 for optically connecting receptacle-side ferrule(s) with connector-side ferrule(s) (not shown). Optical receptacle 16 also includes a pair of alignment guides 40 for aligning and retaining receptacle-side ferrules (not shown) in optical alignment with lenses 38 of receptacle lens body 26. Optical receptacle may also include another pair of alignment guides 42, for aligning and retaining additional active components with respect to the lenses on the optical receptacle is desired. For instance, the active components may be disposed on an optoelectronic board assembly having active components such as lasers, photodiodes and/or photodectectors that may be disposed on as a daughter card (not shown), for converting between optical and electrical signals. Consequently, the concepts of optical receptacle 16 may be used with different configurations depending the desired application.

Figure 3:
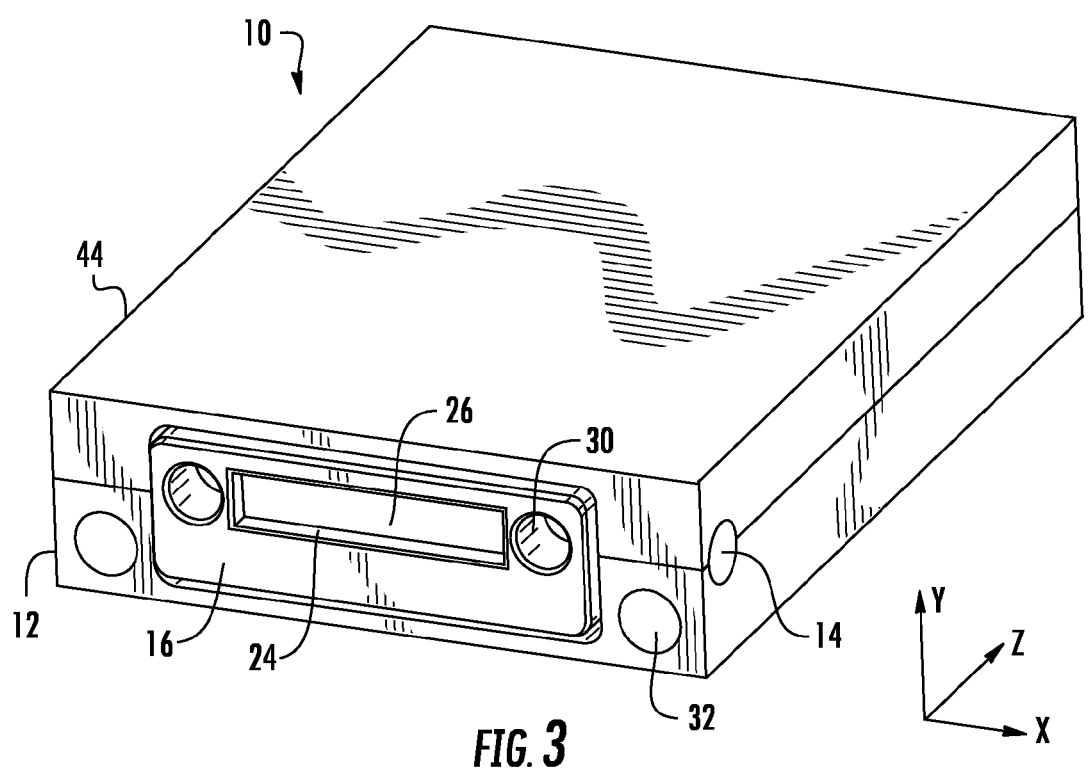
FIG. 3 illustrates the receptacle optical assembly of FIG. 1, with a cover matingly engaging with a receptacle housing to fully enclose the optical receptacle.

FIG. 3 illustrates the receptacle optical assembly 10 of FIG. 1, with a cover 44 matingly engaging with receptacle housing 12. The cover 44 cooperates with the receptacle housing 12 to fully enclose a rear portion of optical receptacle 16, while permitting access to the window 24, receptacle lens body 26, and alignment holes 30 of optical receptacle 16. In this manner, the receptacle optical assembly 10 may be disposed in a device, such as a consumer electronic device, and may receive a fiber optic connector, as illustrated in detail in FIGS. 4A-4C.

Figure 4A:
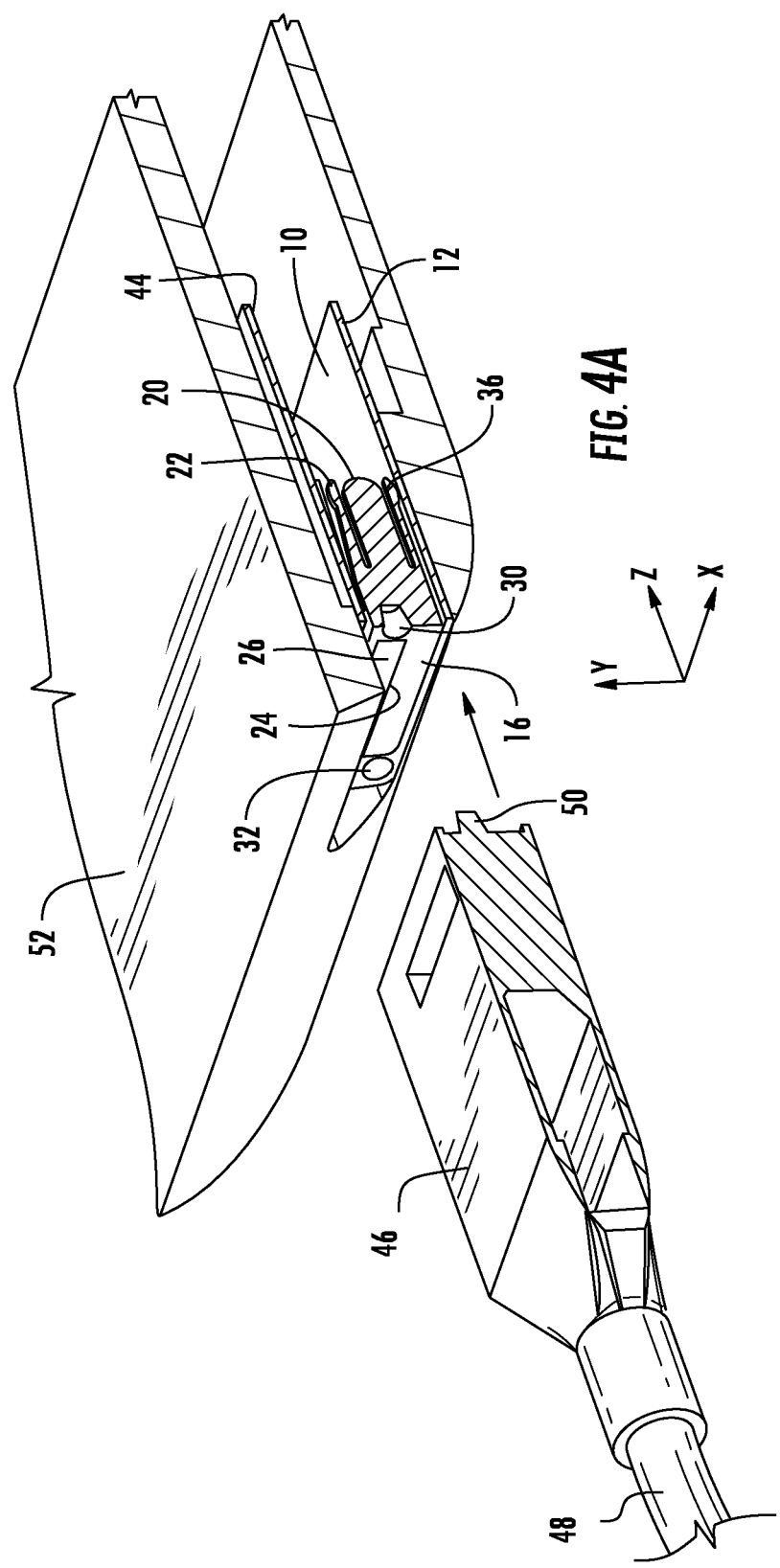
FIGS. 4A-4C illustrate side perspective cutaway views of the receptacle optical assembly of FIG. 1 disposed in an electronic device, with a fiber optic connector being plugged directly into the optical receptacle of the receptacle optical assembly.
Figure 4B:
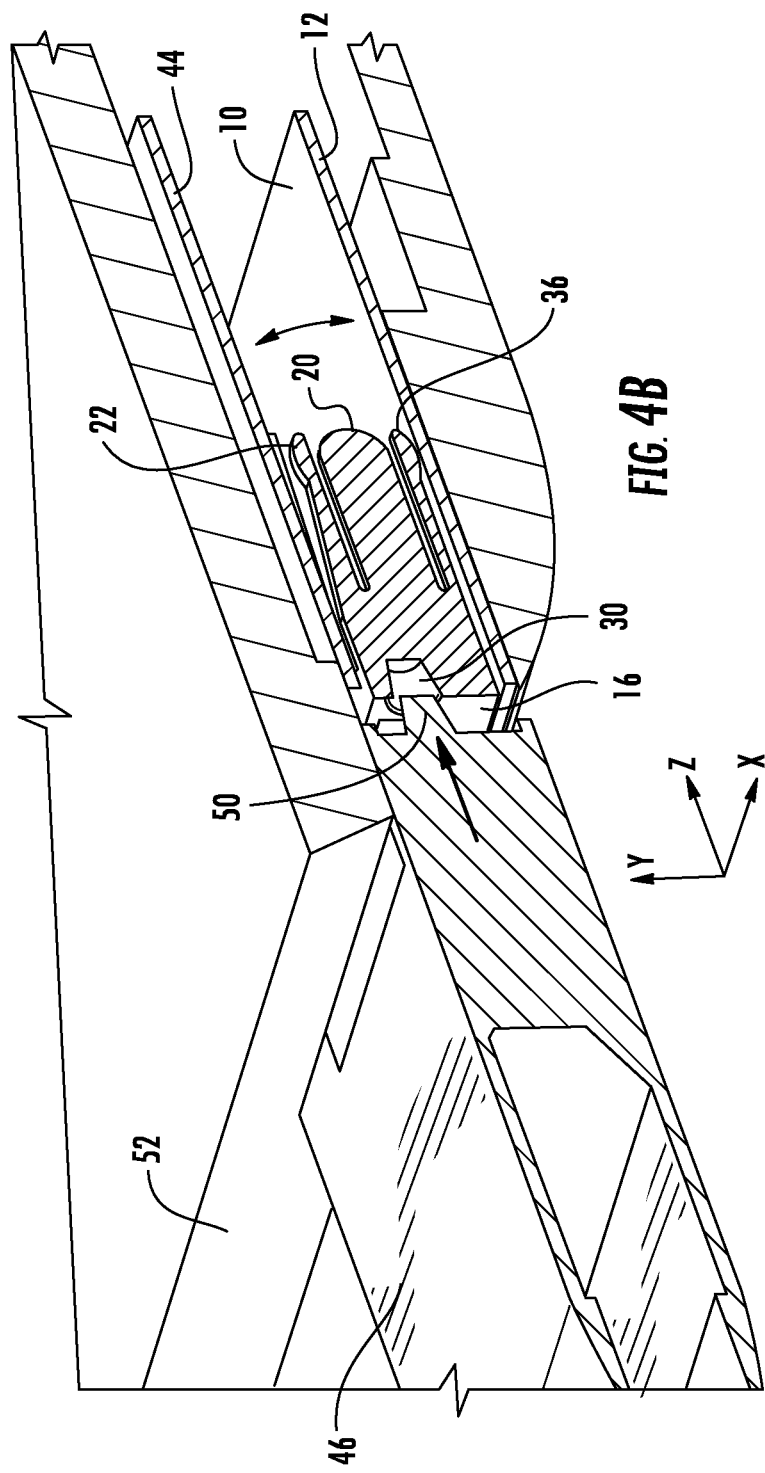
Figure 4C:
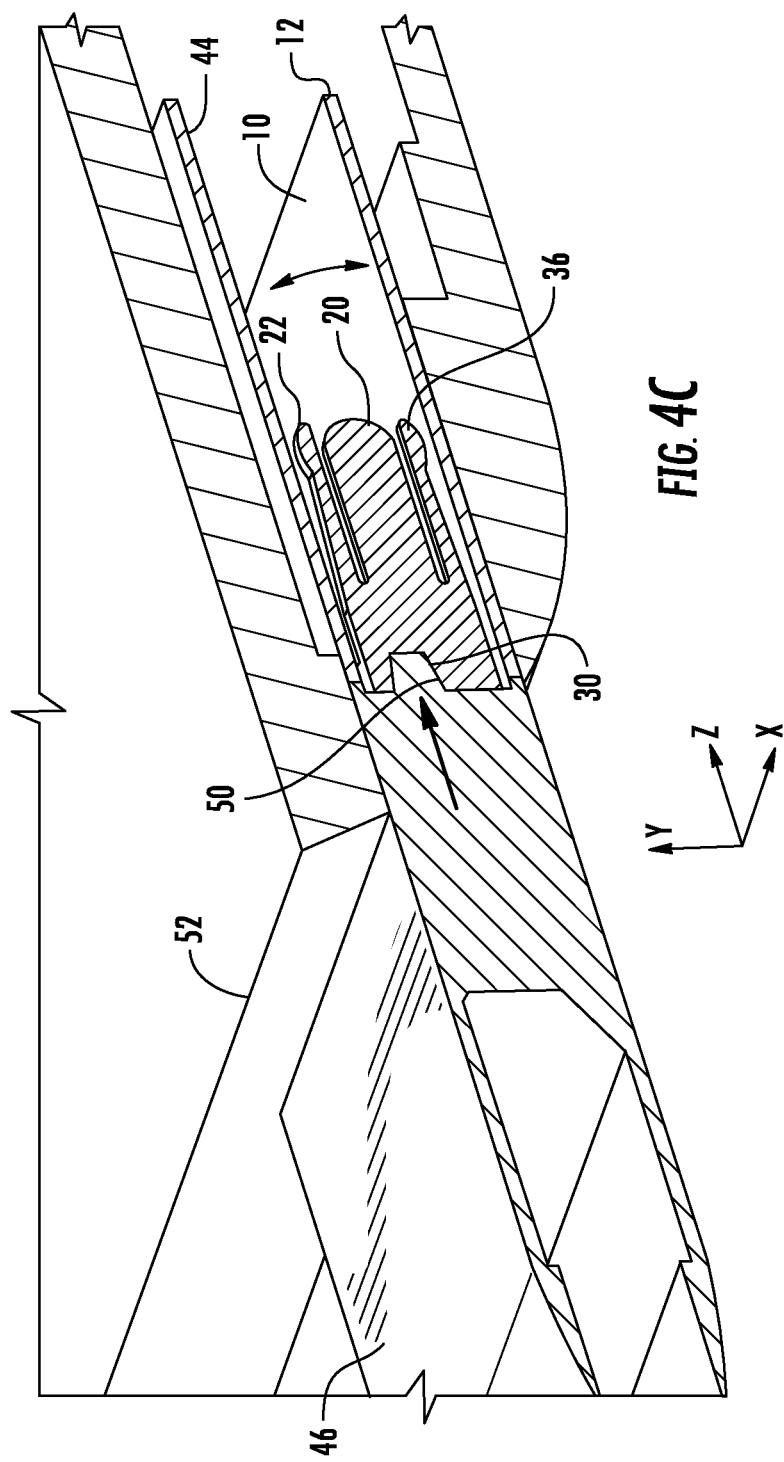

In this regard, FIGS. 4A-4C illustrate side perspective cutaway views of the receptacle optical assembly of FIG. 1 disposed in an electronic device, with a complementary fiber optic connector 46 being plugged directly into the optical receptacle 16 of the receptacle optical assembly 10. FIG. 4A illustrates a cutaway view of the fiber optic connector 46 prior to insertion into the optical receptacle 16. The fiber optic connector 46 may be attached to an end of a fiber optic cable 48. The fiber optic connector 46 also may include a pair of alignment pins 50, which are configured to matingly engage with alignment holes 30 of the optical receptacle during insertion. In this embodiment, the receptacle optical assembly 10 may be disposed in a consumer electronic device 52. Examples of consumer electronic devices 52 include, without limitation, devices that may benefit from the high bandwidth of a fiber optic connection, such as hard drives, personal digital assistants, smartphones, personal media players, and digital cameras. The disclosure may be useful, for example, in the consumer electronics field. The fiber optic connector 46 may be a simple, monolithic connector without any moving parts, because the optical receptacle 16 has sufficient rotational compliance to form a strong optical connection. Thus, the size, complexity, and cost of the fiber optic connector 46 can be reduced, making the fiber optic connector 46 and receptacle 16 more suitable for consumer electronics applications.

FIG. 4B illustrates a cutaway view of the fiber optic connector 46 being inserted into the optical receptacle 16. In this embodiment, minor rotational offset caused by manual insertion of the fiber optic connector 46 may be compensated for by the rotation of the optical receptacle 16 within receptacle housing 12 through the predetermined angular range. As shown by FIGS. 4B, when fiber optic connector 46 is inserted into optical receptacle 16, alignment pins 50 insert into alignment holes 30 to optically align the connector-side and receptacle side ferrules (not shown). In this embodiment, alignment holes 30 and alignment pins 50 have complementary tapered surfaces for urging the alignment pins 50 into lateral alignment with the alignment holes 30. At the same time, the insertion force of the fiber optic connector 46 causes the optical receptacle 16 to rotate into rotational alignment with the fiber optic connector 46 within the predetermined angular range, e.g., 2° -3°.

FIG. 4C illustrates a detailed cutaway view of the fiber optic connector 46 fully inserted into and connected with the optical receptacle 16. After the fiber optic connector 46 is fully inserted into the optical receptacle 16, the two components are biased back toward a neutral rotational position by top and bottom leaf springs 22, 36. However, even after the connection is formed, the optical receptacle 16 may still be permitted to rotate about rotational axis A within the predetermined angular range (A), because the fiber optic connector 46 may be permitted to rotate along with the optical receptacle 16, thereby maintaining optical alignment between the ferrule(s) of the fiber optic connector 46 and the ferrule(s) of the optical receptacle 16.

It should be understood that the fiber optic connector 46 of FIGS. 4A-4C may also include additional compliance features as a supplement to compliance features of the receptacle optical assembly 10 and other embodiments disclosed herein. It should also be understood that, while the embodiment of FIGS. 1-4C allows for rotation of optical receptacle 16 about a single rotational axis, other embodiments may permit rotation about two or more axes within predetermined angular ranges.

Figure 5:
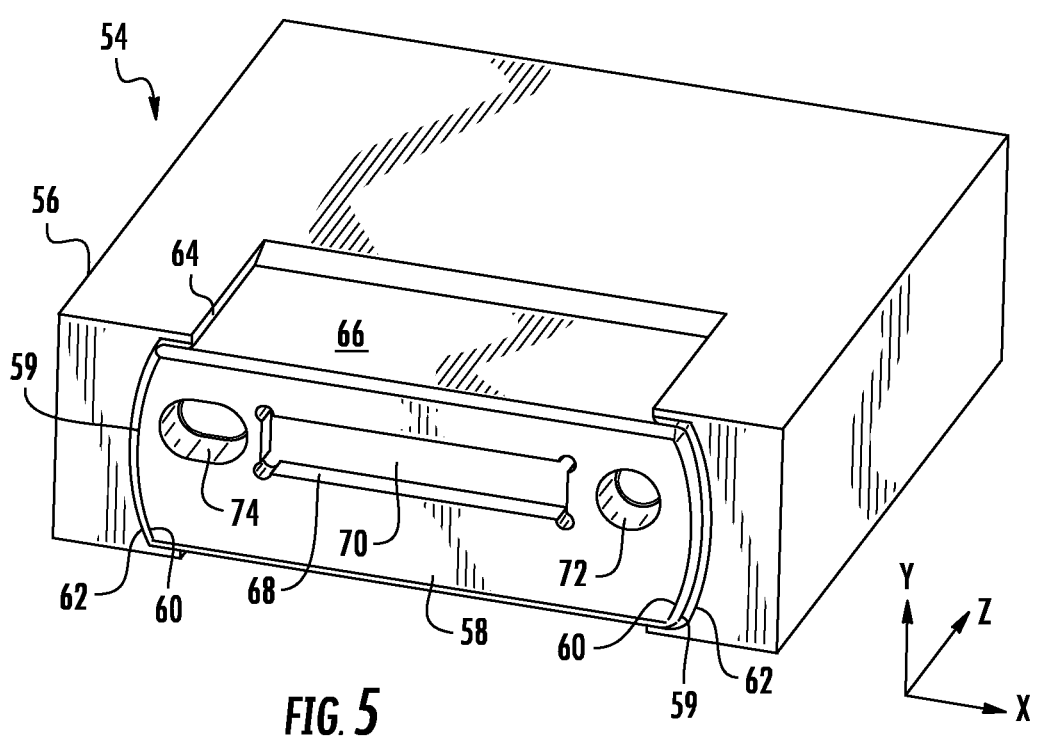
FIG. 5 illustrates a front perspective view of another receptacle optical assembly having a gimbal interface as a rotational compliance support interface according to an alternative embodiment, which permits rotation in all three axes of rotation.

In this regard, FIG. 5 illustrates a receptacle optical assembly 54 according to an alternative embodiment. The receptacle optical assembly 54 of FIG. 5 comprises a receptacle housing 56 that permits rotation of an optical receptacle 58 in all three axes of rotation. In this embodiment, receptacle housing 56 receives and supports optical receptacle 58 via a pair of support interfaces 59. Each support interface 59 in this example may be a gimbal interface comprising a pair of convex spherical mating surfaces 60 on either side of the optical receptacle 58. These convex spherical mating surfaces 60 matingly and rotationally engage with complementary concave spherical mating surfaces 62 of receptacle housing 56. In this embodiment, convex and concave spherical mating surfaces 60, 62 all share a common theoretical center point, thereby permitting the optical receptacle 58 to rotate with respect to receptacle housing 56 about all three axes of rotation with respect to the theoretical center point. Similar to the embodiment of FIGS. 1-4C, one or more stops, such as stop 64, are disposed on receptacle housing 56 to abut complementary top surfaces, such as top surface 66 of optical receptacle 58. In the embodiment of FIG. 5, stop 64 prevents over rotation of the optical receptacle 58 with respect to receptacle housing 56.

Similar to the embodiment of FIGS. 1-4C, optical receptacle 58 of FIG. 5 may include a window 68 for accessing a receptacle lens body 70 mounted therein. Alignment holes 72, 74 are also included to permit insertion of a standard fiber optic connector, such as fiber optic connector 46 of FIGS. 4A-4C.

Figure 6A:
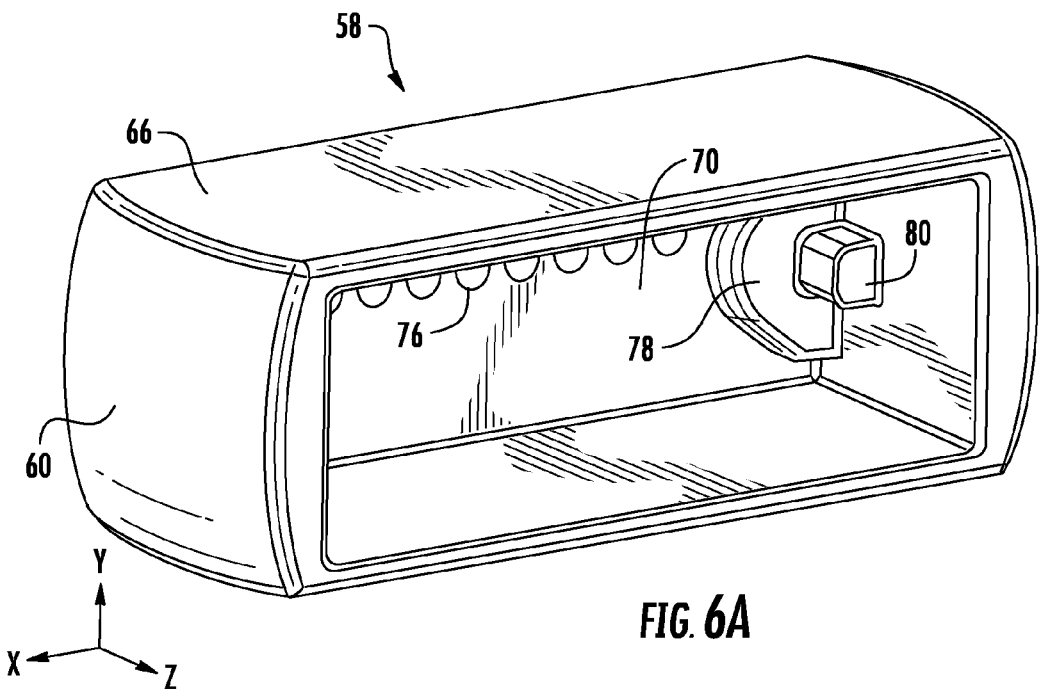
FIGS. 6A and 6B illustrate rear and front perspective views of the optical receptacle of FIG. 5.

FIGS. 6A illustrates a rear perspective views of optical receptacle 58 of FIG. 5. Similar to the embodiment of FIG. 2B, the optical receptacle 58 of FIG. 6A may include a receptacle lens body 70 having an array of lenses 76 for optically connecting receptacle-side and connector-side ferrule(s). Optical receptacle 58 may include a pair of alignment guides 78 for aligning and retaining ferrules and other optical components, similar to alignment guides 40 of FIG. 2B. Optical receptacle 58 of FIG. 6A also may include another pair of alignment guides 80, similar to alignment guides 42 of FIG. 2B, for aligning and retaining additional active components, such as a daughter card or other optical electrical connection components.

Figure 6B:
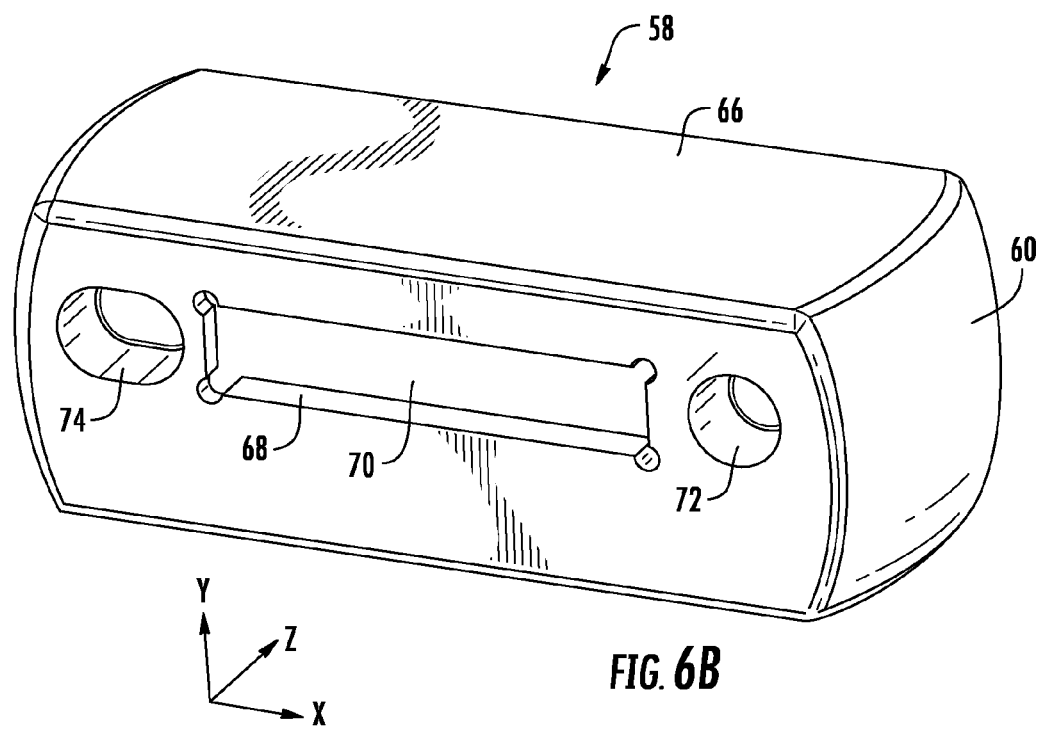

FIG. 6B illustrates a detailed front perspective view of the optical receptacle 58 of FIG. 5. As discussed above with respect to FIG. 5, alignment holes 72, 74 are included to permit insertion of a fiber optic connector, such as fiber optic connector 46 of FIGS. 4A-4C. In this embodiment, alignment hole 72 may be a round shaped hole, while alignment hole 74 may be an ovoid shaped hole, with a small amount of horizontal compliance, for permitting greater tolerances in connector and receptacle manufacturing. It should be understood that this additional alignment feature may also be included or omitted in any of the other embodiments disclosed herein.

Figure 7:
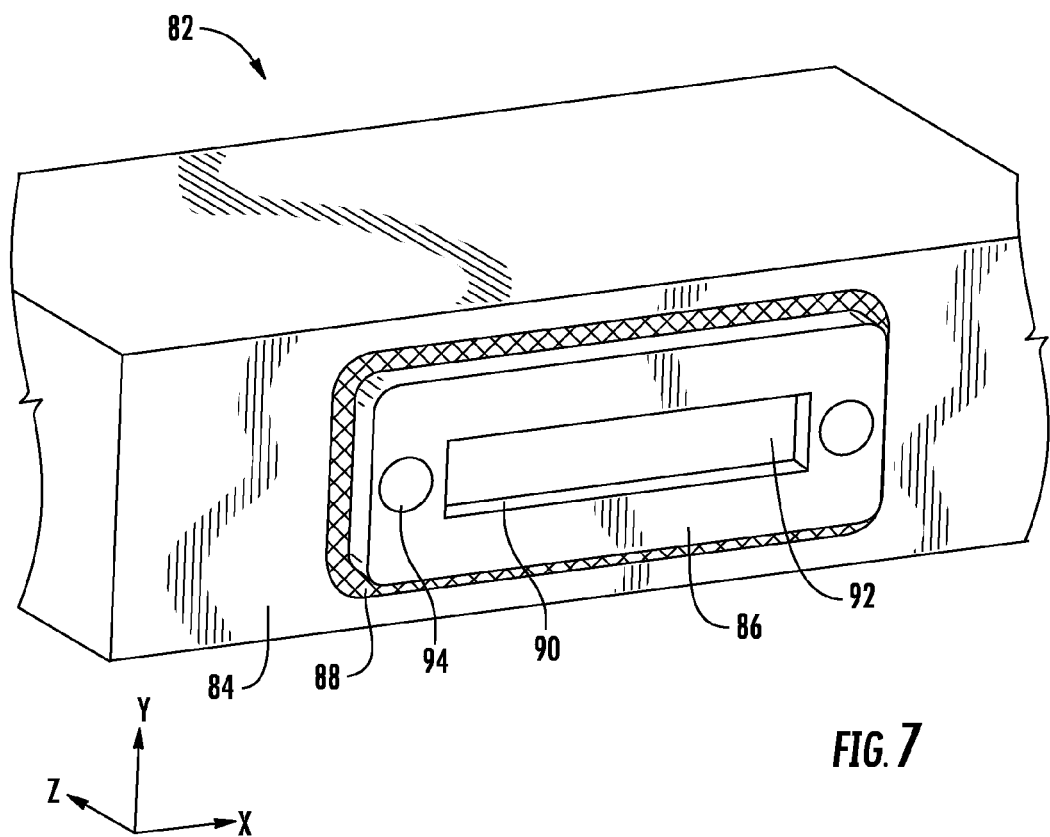
FIG. 7 illustrates a front perspective view of another receptacle optical assembly having a resilient support gasket as a rotational compliance support interface according to an alternative embodiment, which permits rotational compliance of the optical receptacle with respect to the receptacle housing in three axes, and also permits translation of the optical receptacle in an insertion direction of a fiber optic connector.

In some alternative embodiments, it may be desirable to permit translational compliance as well as rotational compliance of a optical receptacle within a receptacle housing. In this regard, FIG. 7 illustrates a receptacle optical assembly 82 according to an alternative embodiment having a receptacle housing 84 and an optical receptacle 86 mounted therein. In this embodiment, the optical receptacle 86 may be supported and retained in receptacle housing 84 by a resilient support gasket 88. The resilient support gasket 88 provides a support interface between the receptacle housing 84 and optical receptacle 86 that permits a small amount of rotational compliance in all three axes, and also permits a small amount of translation of the optical receptacle 86 in an insertion direction of a fiber optic connector, such as fiber optic connector 46 of FIGS. 4A-4C. In this embodiment, the optical receptacle 86 may include a window 90 having a receptacle lens body 92, and also may include a pair of alignment holes 94, which operate in a similar manner to the above-described embodiments. In exemplary embodiments a fluid-proof seal may be formed by the resilient support gasket 88, thereby preventing unwanted liquids or gasses from penetrating or escaping the receptacle housing 84. In one embodiment, the receptacle optical assembly 82 can be made waterproof in this manner.

Figure 8:
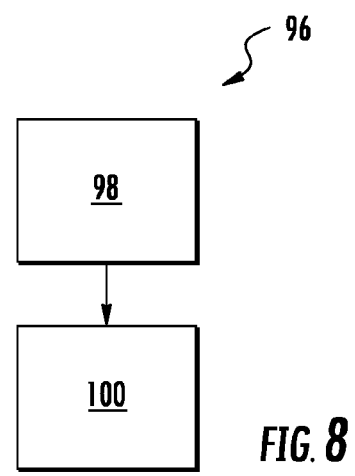
FIG. 8 illustrates a flowchart diagram of an exemplary method of inserting a fiber optic connector into a receptacle optical assembly having a compliance support assembly for permitting movement of the optical receptacle during insertion of the fiber optic connector according to an exemplary embodiment.

FIG. 8 illustrates a flowchart diagram of an exemplary method 96 of inserting a fiber optic connector into a receptacle optical assembly having a compliance support assembly for permitting movement of the optical receptacle during insertion of the fiber optic connector according to an exemplary embodiment. The method 96 of this embodiment comprises longidudinally aligning the fiber optic connector with an optical receptacle of the receptacle optical assembly (block 98). The method 96 further comprises applying an insertion force to the fiber optic connector such that the optical receptacle moves with respect to a receptacle housing of the receptacle optical assembly into optical alignment with the fiber optic connector in response to the insertion force (block 100).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A receptacle optical assembly, comprising:
   a receptacle housing;
   an optical receptacle disposed in the receptacle housing, the optical receptacle configured to optically connect at least one fiber optic component; and
   at least one compliance support interface disposed between the receptacle housing and the optical receptacle, the at least one support interface configured to permit the optical receptacle to move with respect to the receptacle housing in response to insertion of a fiber optic connector such that an insertion force of the connector causes the optical receptacle to move into optical alignment with the fiber optic connector.

2. The receptacle optical assembly of claim 1, wherein the compliance support interface is a rotational compliance support interface configured to permit the optical receptacle to rotate in at least one axis with respect to the receptacle housing in response to insertion of the fiber optic connector such that an insertion force of the connector causes the optical receptacle to rotate into optical alignment with the fiber optic connector.

3. The receptacle optical assembly of claim 2, wherein the optical receptacle comprises at least one stop configured to limit rotation of the optical receptacle within a predetermined angular range.

4. The receptacle optical assembly of claim 3, wherein the predetermined angular range is less than or equal to approximately three degrees (3°).

5. The receptacle optical assembly of claim 2, further comprising at least one bias element configured to bias the optical receptacle towards a predetermined rotational position with respect to the receptacle housing.

6. The receptacle optical assembly of claim 5, wherein the at least one bias element is comprised of at least one leaf spring.

7. The receptacle optical assembly of claim 5, wherein the at least one bias element comprises at least one first bias element configured to bias the optical receptacle in a first rotational direction, and at least one second bias element configured to bias the optical receptacle in a second rotational direction opposite the first rotational direction.

8. The receptacle optical assembly of claim 7, wherein the at least one first bias element is configured to generate a first biasing force, and the at least one second bias element is configured to generate a second biasing force having a different magnitude than the first biasing force.

9. The receptacle optical assembly of claim 2, wherein the at least one support interface comprises at least one boss disposed on one of the optical receptacle and the receptacle housing, the boss configured to mate with a seat disposed on the other of the optical receptacle and the receptacle housing.

10. The receptacle optical assembly of claim 9, wherein the at least one boss is integrally formed with the optical receptacle.

11. The receptacle optical assembly of claim 2, wherein the at least one support interface is further configured to permit the optical receptacle to rotate in a plurality of axes with respect to the receptacle housing in response to insertion of a fiber optic connector such that an insertion force of the fiber optic connector causes the optical receptacle to rotate into optical alignment with the fiber optic connector.

12. The receptacle optical assembly of claim 11, wherein the at least one support interface comprises at least one gimbal interface.

13. The receptacle optical assembly of claim 12, wherein the at least one gimbal interface comprises at least one convex spherical mating surface disposed on the optical receptacle configured to mate with a concave spherical mating surface disposed on the receptacle housing.

14. The receptacle optical assembly of claim 2, wherein the at least one support interface comprises at least one resilient support gasket.

15. The receptacle optical assembly of claim 14, wherein the at least one resilient support gasket forms a fluid-proof seal between the optical receptacle and the receptacle housing.

16. The receptacle optical assembly of claim 1, wherein the compliance support interface is a translational compliance support interface configured to permit the optical receptacle to translate with respect to the receptacle housing in response to insertion of the fiber optic connector such that an insertion force of the connector causes the optical receptacle to move into optical alignment with the fiber optic connector.

17. The receptacle optical assembly of claim 16, wherein the at least one support interface comprises at least one resilient support gasket.

18. The receptacle optical assembly of claim 17, wherein the at least one resilient support gasket forms a fluid-proof seal between the optical receptacle and the receptacle housing.

19. The receptacle optical assembly of claim 1, wherein the optical receptacle comprises at least one stop configured to limit movement of the optical receptacle with respect to the housing.

20. The receptacle optical assembly of claim 1, further comprising at least one bias element configured to bias the optical receptacle towards a predetermined position with respect to the receptacle housing.

21. The receptacle optical assembly of claim 20, wherein the at least one bias element is comprised of at least one leaf spring.

22. The receptacle optical assembly of claim 20, wherein the at least one bias element comprises at least one first bias element configured to bias the optical receptacle in a first direction, and at least one second bias element configured to bias the optical receptacle in a second direction opposite the first direction.

23. The receptacle optical assembly of claim 1, wherein the at least one support interface comprises at least one boss disposed on one of the optical receptacle and the receptacle housing, the boss configured to mate with a seat disposed on the other of the optical receptacle and the receptacle housing.

24. The receptacle optical assembly of claim 1, wherein the at least one support interface comprises at least one gimbal interface.

25. The receptacle optical assembly of claim 1, wherein the at least one support interface comprises at least one resilient support gasket.

26. The receptacle optical assembly of claim 1, wherein the at least one support interface forms a fluid-proof seal between the optical receptacle and the receptacle housing.

27. A method of inserting a fiber optic connector into a receptacle optical assembly, comprising:
   longitudinally aligning the fiber optic connector with an optical receptacle of the receptacle optical assembly, wherein the receptacle optical assembly comprises a receptacle housing, an optical receptacle disposed in the receptacle housing, the optical receptacle configured to optically connect at least one fiber optic component, and at least one compliance support interface disposed between the receptacle housing and the optical receptacle; and
   applying an insertion force to the fiber optic connector such that the optical receptacle moves with respect to a receptacle housing of the receptacle optical assembly into optical alignment with the fiber optic connector in response to the insertion force, wherein the at least one compliance support interface permits the optical receptacle to move with respect to the receptacle housing in response to the insertion force of the fiber optic connector such that an insertion force of the connector causes the optical receptacle to move into optical alignment with the fiber optic connector.

28. The method of claim 27, wherein applying the insertion force to the fiber optic connector causes the optical receptacle to rotate in at least one axis with respect to the receptacle housing into optical alignment with the fiber optic connector.

29. The method of claim 28, wherein applying the insertion force to the fiber optic connector causes the optical receptacle to rotate in a plurality of axes with respect to the receptacle housing into optical alignment with the fiber optic connector in response to the insertion force.

30. A system for optically connecting fiber optic components comprising:
- a fiber optic connector; and
- a receptacle optical assembly for receiving the fiber optic connector, comprising:
  - a receptacle housing;
  - an optical receptacle disposed in the receptacle housing, the optical receptacle configured to optically connect at least one fiber optic component with the fiber optic connector; and
  - at least one compliance support interface disposed between the receptacle housing and the optical receptacle, the at least one support interface configured to permit the optical receptacle to move with respect to the receptacle housing in response to insertion of the fiber optic connector such that an insertion force of the connector causes the optical receptacle to move into optical alignment with the fiber optic connector.

31. The receptacle optical assembly of claim 30, wherein the compliance support interface is a rotational compliance support interface configured to permit the optical receptacle to rotate in at least one axis with respect to the receptacle housing in response to insertion of the fiber optic connector such that an insertion force of the connector causes the optical receptacle to rotate into optical alignment with the fiber optic connector.

32. The system of claim 30, wherein the fiber optic connector comprises at least one ferrule rigidly disposed within a connector housing such that the insertion force does not cause the at least one ferrule to move with respect to the connector housing.

33. The system of claim 30, wherein the fiber optic connector comprises at least one ferrule disposed within a connector housing such that the insertion force causes the at least one ferrule to move with respect to the connector housing into alignment with the optical receptacle.

34. The system of claim 30, further comprising an electronic device, wherein the receptacle optical assembly is disposed in the electronic device such that the receptacle optical assembly is in communication with the electronic device.

* * * * *